Nov. 21, 1967     D. M. PETERSON ET AL     3,353,465
MINIATURE FLASH ATTACHMENT AND PHOTOFLASH
LAMP SOCKET RECEIVING PORTION
Filed Dec. 14, 1964

DEAN M. PETERSON
CHARLES E. PICKERING
INVENTORS

BY R. Frank Smith
Ronald S. Kaehler

ATTORNEYS

United States Patent Office 3,353,465
Patented Nov. 21, 1967

3,353,465
MINIATURE FLASH ATTACHMENT AND PHOTO-
FLASH LAMP SOCKET RECEIVING PORTION
Dean M. Peterson and Charles E. Pickering, Rochester,
N.Y., assignors to Eastman Kodak Company, Rochester, N.Y., a corporation of New Jersey
Filed Dec. 14, 1964, Ser. No. 417,913
14 Claims. (Cl. 95—11.5)

ABSTRACT OF THE DISCLOSURE

A multilamp flash device and socket receiving portion comprising a cover having central access opening to receive a multilamp unit connecting post engageable with spring retaining means below the cover, the cover also having an annular groove with circuit terminals to receive a multilamp unit contact ring and lamp lead-in wires. The device also may comprise a hollow body containing a source of electrical potential located below the cover and spring retaining means.

This invention relates to flash photography, and more particularly to flash devices for use as a part of or with photographic cameras.

There has been developed a disposable multilamp photoflash unit or package, disclosed for example in an application for Letters Patent, U.S. Ser. No. 417,914, entitled "Disposable Multilamp Photoflash Unit" and filed of even date herewith in the name of F. D. Kottler et al. The present invention comprises an improved socket arrangement and a miniaturized flash attachment for existing photographic cameras and designed to accept and make full use of such disposable multilamp units.

An important object of the present invention, therefore, resides in the provision of a miniaturized flash attachment accepting disposable multilamp photoflash units and designed to be used with existing photographic cameras.

Another object of the present invention is in the provision of a socket arrangement for receiving a disposable multilamp photoflash package, including terminal circuit means to place a selected one photoflash lamp of the unit in a photoflash circuit.

Still another object resides in the provision of spring retaining means forming a portion of the receiving socket and designed to insure a firm retention of the multilamp unit while permitting selective indexing of the unit by rotation about the axis of the unit in order to successively place selected ones of photoflash lamps in the circuit without disturbing or otherwise injuring the receiving socket or other parts of the flash system.

These and other objects and advantages will become more apparent in the course of the following description, the accompanying drawings forming a part thereof and wherein.

Figure 4:
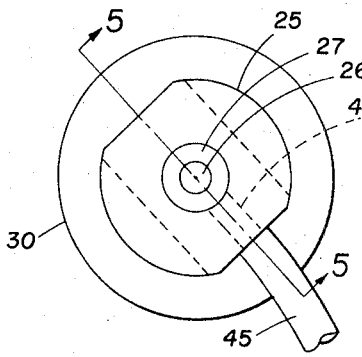
FIG. 4 is a bottom view of the preferred embodiment.
Figure 1:
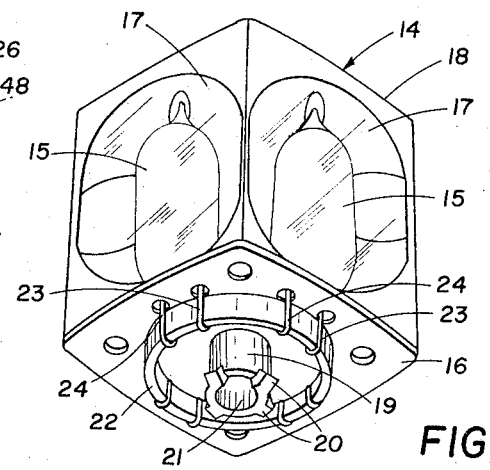
FIG. 1 is a partially sectioned perspective view of a preferred embodiment of the present invention, together with a disposable multilamp photoflash unit suitable for use therewith.

The preferred embodiment of the present invention shown in the drawing comprises a small cylindrical body portion 11 and a camera attaching portion 12 for insertion in known types of camera accessory shoes. Within the body portion 11 are the elements forming the part of the flash circuit normally associated with a separate flash attachment and a socket portion 13 for receiving a disposable multilamp photoflash unit 14 as disclosed in the Kottler et al. application.

The disposable multilamp photoflash unit, as is more fully described in the Kottler et al. application, comprises a disposable package 14 containing a plurality (four) of photoflash lamps 15 ordinately mounted in a vertical position about an axis of rotation on a base portion 16. Individual reflector surfaces 17 controlling the direction of light emission from the lamps 15 and a transparent or light transmitting protective cover 18 over the lamps 15 complete the package.

The base portion 16 defines four lamp sides and includes a depending center post 19 having four engagement lugs 20 each extending radially outwardly toward a respective lamp side. The engagement lugs 20 each define upper and lower ramped surfaces to enable ready insertion and removal of the unit from the receiving socket. The center post 19 defines the vertical axis about which the unit 14 is rotated, and the post 19 may also define a central opening 21 for receiving a corresponding stabilizing spindle on the receiving socket of the disclosed flash attachment.

Surrounding the center post 19 of the unit 14 and coaxial therewith is a depending electrical contact ring 22. A pair of electrical lead-in wires 23 and 24 extending to the interior of the photoflash lamps 15 for ignition thereof in a known manner are wrapped by bending vertically around the contact ring 22 in the manner shown.

Returning to the present invention as shown by the preferred embodiment, the camera attaching portion 12 comprises a known type of attaching foot 25 insertable in the accessory shoes of many types of photographic cameras. The foot 25 is made of electrically conductive material and includes a centrally located and vertically arranged opening having a vertically slidable center contact 26 which is also made of electrically conductive material. Thus, the attaching portion 12 is suitable for electrical contact with known types of accessory shoes designed with corresponding electrical terminals for completion of a photoflash circuit through a camera shutter synchronizing switch. Separating the foot 25 and the center contact 26 is a sleeve 27 of electricaly insulative material. An annular shoulder 28 which is engageable with with an annular stop surface 29 on the center contact 26 is defined by the foot 25 and sleeve 27 in order to limit outward movement of the contact 26 to the position shown in FIG. 2.

The body portion 11 is formed by a hollow cylindrical housing member 30 of electrically conductive material. The housing member 30 is electrically connected to the foot 25 and this may be accomplished by forming the member 30 integrally with the foot 25. An insulative tube or sleeve 31 lines the interior of the cylindrical member 30, and a pair of vertically aligned miniaturized cylindrical batteries 32 of a known type are electrically connected in series to comprise the required source of electrical potential. A U-spring 33 of electrically conductive material engages both the lower pole (positive) of the batteries 32 and the upper end of center contact 26 to urge the contact outward against the shoulder 28 to ensure positive engagement with the center electrical terminal of an accessory shoe.

Figure 3:
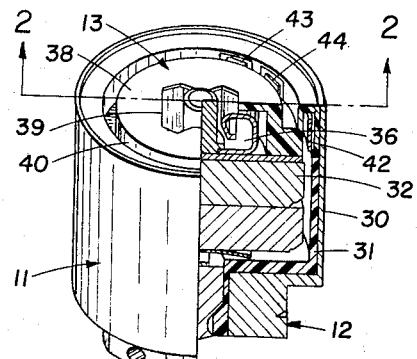
FIG. 3 is a sectional view taken on line 3—3 of FIG. 2.
Figure 3:
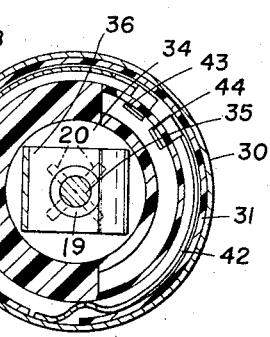

Located above and engaging the upper pole (negative) of the batteries 32 for electrical contact therewith is a disk 34 of electrically conductive material. A stabilizing spindle 35 shaped to fit within the opening 21 of the multilamp photoflash unit 14 is affixed to the top of disk 34. A substantially U-shaped multilamp unit retaining spring 36 is mounted in a fixed position between the top of disk 34 and a collar provided at the lower end of spindle 35. The spring 36 includes upright inwardly curved or spiraled ends 37 which are outwardly flexible so as to be engageable with the ramped surfaces of the lugs 20 of a multilamp unit 14. A central hole in the cross arm or base portion of the spring 36 is provided in order that the portion of the post 35 below the collar may extend therethrough to retain the spring 36 in the position shown. The spring 36 is made of a resilient web material which has a width sufficient to enable each spring end 37 to engage and override a pair of adjacent lugs 20 of a unit 14 whenever the lugs are at a 45° angle to the longitudinal axis of the spring as shown in FIG. 3.

Covering the top of the cylindrical housing member 30 is a preshaped, moulded cover 38 made of an electrically insulative material such as a thermoplastic. A substantially X-shaped access opening 39 is located at the center of the cover 38 and is located to permit insertion of a multilamp unit 14 in any one of four positions in which adjacent retaining lugs 20 simultaneously engage a spring end 37 as shown in FIG. 3. A circular groove 40 surrounding the opening 39 is also moulded into the cover 38, the groove 40 having an effective diameter and width which will enable it to receive the contact ring 22 of a multilamp unit 14 as shown in phantom in FIG. 2.

To complete the electrical circuit to a selected one of the photoflash lamps 15, there is provided a pair of electrical leads 41, 42 having respective contact terminals 43, 44 situated at the periphery of groove 40 through suitable openings in the groove walls. The terminals 43, 44 are positioned such that they are disposed at the side of the attachment facing forwardly in the direction of the camera objective axis, such as whenever the attachment is inserted into an accessory shoe. The terminals thus provide electrical contact with the corresponding lead-in wires of one of the photoflash lamps 15 when a unit 14 has been inserted in any one of its four insertion positions, the longitudinal axis of spring 36 being 45° to the direction of the terminal position. The first lead 41 engages the disk 34 for electrical contact therewith whereas the second lead 42 is held in electrical engagement with the inner wall of the cylindrical member 30 as shown in FIG. 3. Thus, the electrical circuit of the photoflash arrangement extends from one of the lead-in wires of the photoflash lamp facing in the direction of the camera objective axis, through terminal 43 and electrical lead 41 to disk 34 and through batteries 32 and spring 33 to contact 26 for electrical connection with a contact terminal of the associated camera circuit. Completion of the circuit from the other camera contact terminal is through the attaching foot 25 to the cylindrical member 30 and hence from electrical lead 42 to the other lamp lead-in wire.

Figure 5:
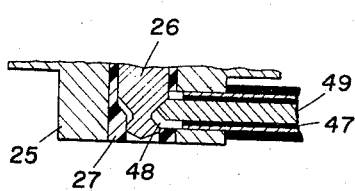
FIG. 5 is a partial side view showing in cross section the camera contact element cooperating with a separable electrical plug-in cord for use with photographic cameras having continental-type or like cord receiving plugs for connecting flash attachments to operate in timed relation with the cameras.

For use with photographic cameras not having accessory shoes, or with photographic cameras having accessory shoes without electrical contact terminals, there is provided a separate electrical cable or cord 45 which may be used to connect the flash attachment to another socket arrangement in the camera for timed operation therewith. The cord 45 is comprised of a coaxial cable of two conductors, the end of the cord not shown being connectable to the camera by the inclusion of a usual plug designed to fit a conventional flash-synchronizing and receiving socket on the body of the camera. Referring to FIG. 5, the cord end shown has an outer conductor 47 of tubular shape which is split along a longitudinal line thereof to permit a frictional fit within a receiving socket 48 formed in the foot portion 25 to provide an electrical connection between conductor 47 and member 30 through the attaching foot 25. The inner conductor 49 is separated from the outer conductor 47 by insulation and extends beyond conductor 47 for engagement with the annular stop surface 29 of center contact 26. The end of conductor 49 has a conical shape which causes the contact 26 to be moved upwardly and retracted into the foot portion 25 whenever the cable cord 45 is inserted into the receiving socket 48, thereby preventing the center contact 26 from engaging a metallic accessory shoe not having terminals or otherwise being exposed to an accidental touching simultaneously with foot 25 to effectively bypass the switch mechanism provided in the camera for flash synchronization.

Figure 2:
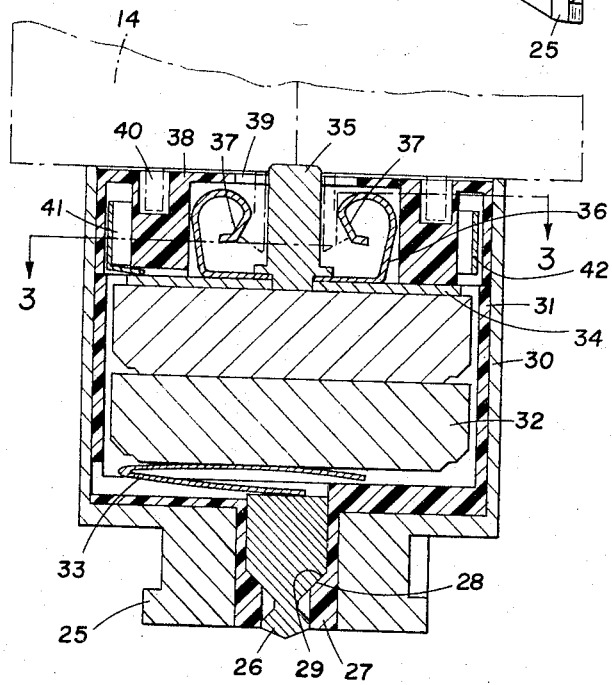
FIG. 2 is a sectional side view taken on line 2—2 of FIG. 1.

In operation, the attachment without the cord 45 is placed in an accessory shoe having an electrical contact arrangement with the lead ends 43, 44 being positioned in the front, i.e. in the direction of the picture-taking or camera objective axis. A disposable multilamp flash package or unit 14 is then inserted through the socket access opening 39 with any one of the unused photoflash lamps 15 facing in the direction of the picture-taking axis. As the unit is inserted, the lower ramp surfaces of lugs 20 urge the upper spiral portion of spring ends 37 outwardly against the spring bias to permit the unit 14 to be fully seated. When the unit 14 is fully seated as shown in phantom in FIG. 2, the lower spiral portion of spring ends 37 are urged radially inwardly against the upper ramped surfaces of the lugs 20 by the resilience of the spring 36, each spring end 37 engaging a pair of adjacent lugs (FIGS. 2 and 3). As will be apparent, the urging of the spring ends 37 against the upper ramped surfaces of the lugs 20 provides a downward force which tends to provide a firmer seating of the unit 14 in the socket portion 13.

When the unit 14 is fully seated, contact ring 22 is positioned in the groove 40, and the outer vertical portions of the lead-in wires of the forward facing photoflash lamp 15 each engage one of the terminal ends 43, 44 for completion of the flash circuit to the lamp. Ignition of the photoflash lamp 15 in timed relation with camera operation may then be accomplished in the usual way.

Following ignition of the forward facing photoflash lamp during camera operation, the unit 14 is then indexed by rotating it 90° about its vertical axis to position the subsequent photoflash lamp 15 in the flash circuit. During the initial stage of rotation, the ends 37 of spring 36 are flexed outwardly as opposing lugs 20 pass through a position of axial alignment with the spring ends 37. As rotation is continued beyond this stage, the spring ends then return toward their inward unit retaining positions in which pairs of adjacent lugs 20 are engaged by each spring end 37. As can be seen, this lateral action on the lugs 20 by the spring end 37 urges the unit 14 toward and tend to maintain the unit 14 in proper alignment with the socket portion 13. The flash attachment and multilamp unit are now in position for the taking of a subsequent picture with an augmenting photoflash.

By the provision of the spring 36, a unit 14 inserted in the socket portion 13 may be freely rotated as desired in any one of its four operating positions without the necessity of removing and reinserting the unit 14 in another position and without disturbing or otherwise injuring the various parts of the flash attachment.

While the invention has been described with respect to one particular embodiment, it is obvious that other arrangements and forms can be resorted to without departing from the spirit of the invention or the scope of the subjoined claims. Thus, the invention has been shown as a separate flash attachment, but it is possible to have the entire structure integrally built within the body of a photographic camera with the terminal electrical contacts in the foot portion 12 being permanently attached to the synchronizing switch mechanism. In such a case, a separate manually controlled mode switch may be included in the circuit in order to provide a selection of either flash or non-flash operation as desired.

We claim:

1. For use with a multilamp flash unit having a plurality of ignitable photoflash lamps mounted on a base with a depending connecting post and a plurality of radially extending lugs, a photoflash attachment comprising:
   a hollow body of electrically conductive material,
   a source of electric potential having a pair of terminal connecting poles disposed within the body,
   spring retaining means positioned above the source and engageable with at least a pair of the lugs of a multilamp flash unit,
   a cover overlying the spring retaining means and defining a central access opening permitting insertion of the connecting post and lugs of a multilamp flash unit into the hollow body for engagement of the spring retaining means with the said pair of lugs, the cover further defining an annular groove coaxial with the access opening,
   a pair of contact terminals disposed within the groove for electrical contact with lead-in wires of a selected one photoflash lamp of an inserted multilamp flash unit,
   a pair of electrical leads, one lead connecting one of the terminals with one pole of the source and the other connecting the other terminal with the hollow body, and
   contact means respectively connected to the other pole of the source and the hollow body for connection to a camera synchronizer switch.

2. The flash attachment according to claim 1 wherein the spring retaining means comprises a vertically disposed and substantially U-shaped web spring having upstanding and inwardly spiraled ends engageable with said pair of lugs, the spiraled ends being flexible outwardly along the longitudinal axis of the spring by the pair of lugs upon insertion of the multilamp flash unit and urged toward each other by spring resilience upon complete insertion to override the pair of lugs and retain the multilamp flash unit by the resilience of the spring.

3. The flash attachment according to claim 2 and further comprising a stabilizing spindle fixed to the web spring between the spiraled ends thereof, the spindle being insertable into an opening in the connecting post of the multilamp flash unit and forming a bearing surface about which the multilamp flash unit may be rotated for electrical contact of lead-in wires of selected others of the photoflash lamps with the contact terminals.

4. A flash attachment comprising a housing member including means for supporting a source of electrical potential and cover means overlying the source supporting means, the cover means defining a central access opening for insertion of the base of a multilamp photoflash unit, the cover means further defining an annular groove coaxial with the opening for receiving a multilamp photoflash unit contact ring having a plurality of photoflash lamp lead-in wires spaced on the contact ring, socket means disposed between the cover means and source supporting means to engage the unit base and retain the unit against the housing, a photoflash lamp circuit including a pair of electrical leads each having a terminal disposed at the periphery of the groove to physically engage a respective one of the lead-in wires and connect a selected one photoflash lamp in the lamp circuit, and means to detachably connect the flash attachment to a cooperating pair of electrical contacts of a camera body for electrical connection of a camera synchronizing switch into the photoflash lamp circuit.

5. The flash attachment according to claim 4 wherein the socket means comprises spring retaining means engageable with the base of a multilamp photoflash unit to retain the unit in a preselected one of a predetermined plurality of rotational positions about an axis of rotation and to permit selective rotation of the unit about the axis of rotation to selected others of the rotational positions.

6. The flash attachment according to claim 5 wherein the spring retaining means comprises a U-shaped web spring having inwardly spiraled ends engaging the unit base.

7. A multilamp unit receiving socket comprising
   cover means defining an access opening for insertion of a rotatable multilamp unit base therein and an annular groove coaxial with and surrounding the access opening for receiving an annular contact ring having thereon a plurality of spaced pairs of lead-in wires extending from a plurality of photoflash lamps, a pair of terminals disposed at the periphery of the groove to physically engage a selected pair of the lead-in wires for electrical connection of the respective photoflash lamp, means for electrically connecting the terminals to a synchronizing photoflash circuit, and multilamp unit retaining means disposed below the access opening, the unit retaining means comprising a resilient spring engageable with an inserted multilamp unit base to retain the multilamp unit in the socket by spring resilience, the spring being flexible to permit selective rotation of the multilamp unit to a selected one of a predetermined plurality of rotational positions in which the terminals engage a selected pair of the lead-in wires.

8. The socket according to claim 7 wherein the resilient spring comprises an upstanding U-shaped web spring with inwardly curved spiral ends engageable with an inserted multilamp unit base, the ends being flexible outwardly to permit insertion of a base and selective rotation of the unit and the ends being urged inwardly against the base to retain the base in a preselected one of the plurality of predetermined rotational positions.

9. The socket according to claim 8 and further comprising an upright stabilizing spindle positioned between the spiral ends of the spring, the spindle fitting into a central bore of the inserted multilamp unit and forming a bearing surface about which the unit is rotated.

10. A multilamp photoflash system comprising in combination:
    a housing,
    a detachable lamp base support having a plurality of photoflash lamps with pairs of lead-in wires mounted thereon about central axis of rotation vertical to the base support,
    a connecting post fixed to and depending from the base support on the axis of rotation, the connecting post including retaining lug means thereon,
    an annular contact ring coaxial with the connecting post and fixed to the bottom surface of the base support, the pairs of lead-in wires extending vertically around the periphery of the contact ring,
    cover means for the housing having a central access opening for detachable insertion of the connecting post into the housing, the cover further defining an annular groove coaxial with the access opening for detachable insertion of the contact ring therein,
    socket means below the access opening engaging the connecting post retaining lug means to retain the support adjacent the cover means with the contact ring disposed in the annular groove, the socket means retaining the support in a selected one of a predetermined number of positions of rotation about the axis, and
    flash circuit means within the housing including a pair of terminals disposed within the groove for engagement with the pair of lead-in wires of a selected one of the photoflash lamps corresponding to the one said position, the socket means permitting selective rotation of the support for engagement of pairs of lead-in wires of selected others of the photoflash lamps with the terminals.

11. The combination according to claim 10 wherein the socket retaining means comprises a vertically disposed, U-shaped web spring with upstanding and inwardly spiraled resilient ends engageable with the retaining lug means by the resilience of the spring ends and the spring ends being flexible outwardly to permit insertion and rotation.

12. The combination according to claim 11 wherein the retaining lug means comprises a plurality of equi-spaced and radially outwardly extending lugs, the spring ends each being engageable at an angle with a pair of adjacent lugs to retain the support in a preselected position of rotation.

13. For use with a multilamp photoflash package including a rotatable lamp base and a plurality of photoflash lamps mounted thereon, a receiving socket comprising a cover defining an access opening for insertion of the rotatable lamp base therein in one of a plurality of predetermined positions of rotation; electrical contact means for electrically connecting a selected one of the photoflash lamps in a photoflash firing circuit when the base is in one of the predetermined positions of rotation; and spring retaining means engageable with the inserted base to retain the multilamp package in the socket, the spring retaining means engaging the base to retain the base, to permit selective rotation of the lamp base and to urge the base in the direction of rotation into the predetermined positions of rotation from positions that are intermediate the predetermined positions of rotation.

14. The socket according to claim 13 wherein the spring means comprises a vertically disposed, U-shaped web spring with upstanding and inwardly spiraled resilient ends, each spring-end engageable with an adjacent pair of laterally extending retaining lugs on the lamp base, the spring ends being flexible outwardly to permit insertion and rotation and the spring ends being urged inwardly to urge the base into one of the predetermined positions of rotation.

References Cited

UNITED STATES PATENTS

| | | | |
|---|---|---|---|
| 3,096,026 | 7/1963 | Prochnow | 240—1.3 |
| 3,244,087 | 4/1966 | Anderson et al. | 95—11 |
| 3,267,272 | 8/1966 | Fischer | 240—1.3 |

FOREIGN PATENTS

| | | |
|---|---|---|
| 1,141,181 | 12/1962 | Germany. |

NORTON ANSHER, *Primary Examiner.*

F. L. BRAUN, *Assistant Examiner.*